(12) United States Patent
Petersen

(10) Patent No.: US 6,499,422 B1
(45) Date of Patent: Dec. 31, 2002

(54) SPEED INDICATION MARKINGS FOR TIRES

(76) Inventor: Grant Petersen, 2646 Buena Vista Ave., Walnut Creek, CA (US) 94596

( * ) Notice: Subject to any disclaimer, the term of this patent is extended or adjusted under 35 U.S.C. 154(b) by 0 days.

(21) Appl. No.: 09/654,772

(22) Filed: Sep. 5, 2000

(51) Int. Cl.$^7$ ............................ G01P 3/02; B60C 11/00; B60C 13/00
(52) U.S. Cl. .................. 116/284; 116/62.1; 116/300
(58) Field of Search ................... 116/28 R, 37, 116/200, 284, 298, 300, 56, 57, 273, 274, 62.1, 62.3; 356/23; 446/243; 152/209.5, 209.11, 209.18; 40/427, 493, 495, 587; 301/37.108; 73/489, 491, 495, 499

(56) References Cited

U.S. PATENT DOCUMENTS

| | | | |
|---|---|---|---|
| 1,675,974 A | * 7/1928 | Gambarotta | ................ 116/57 |
| 1,917,464 A | 7/1933 | Scharnowski | |
| 2,119,627 A | 6/1938 | Kriek | |
| 2,418,651 A | 4/1947 | Maußhardt | |
| 2,558,423 A | * 6/1951 | Dobrosky | ................ 301/37.41 |
| 2,583,275 A | 1/1952 | Olson | |
| 2,621,081 A | * 12/1952 | Mann | ...................... 301/37.25 |
| 2,701,540 A | * 2/1955 | Hamilton | ..................... 116/200 |
| 3,382,908 A | * 5/1968 | Palmquist et al. | .......... 152/555 |
| 3,847,443 A | * 11/1974 | Laurion | ................. 301/37.107 |
| 3,918,708 A | * 11/1975 | Augusta | ...................... 472/72 |
| 3,946,782 A | * 3/1976 | Petrasek et al. | ......... 152/209.5 |
| 4,194,809 A | * 3/1980 | Campagna, Jr. | ............ 359/520 |
| 4,441,762 A | * 4/1984 | Segal | ..................... 301/37.105 |
| 4,631,848 A | * 12/1986 | Iwasa et al. | .................. 40/427 |
| 4,940,184 A | * 7/1990 | Smrt | ......................... 116/284 |
| 5,071,684 A | * 12/1991 | Gewecke | ..................... 428/31 |
| 5,105,308 A | * 4/1992 | Holley et al. | ............... 359/515 |
| 5,931,543 A | * 8/1999 | Smith | ..................... 301/37.28 |

* cited by examiner

Primary Examiner—Christopher W. Fulton
Assistant Examiner—R. Alexander Smith
(74) Attorney, Agent, or Firm—Nixon Peabody LLP; David S. Safran

(57) ABSTRACT

A periodic pattern of colors is applied to a vehicle tire. The periodic pattern provides an indication of relative vehicle speed to an observer. The periodic pattern will appear to blend into a single color above a predetermined speed.

12 Claims, 3 Drawing Sheets

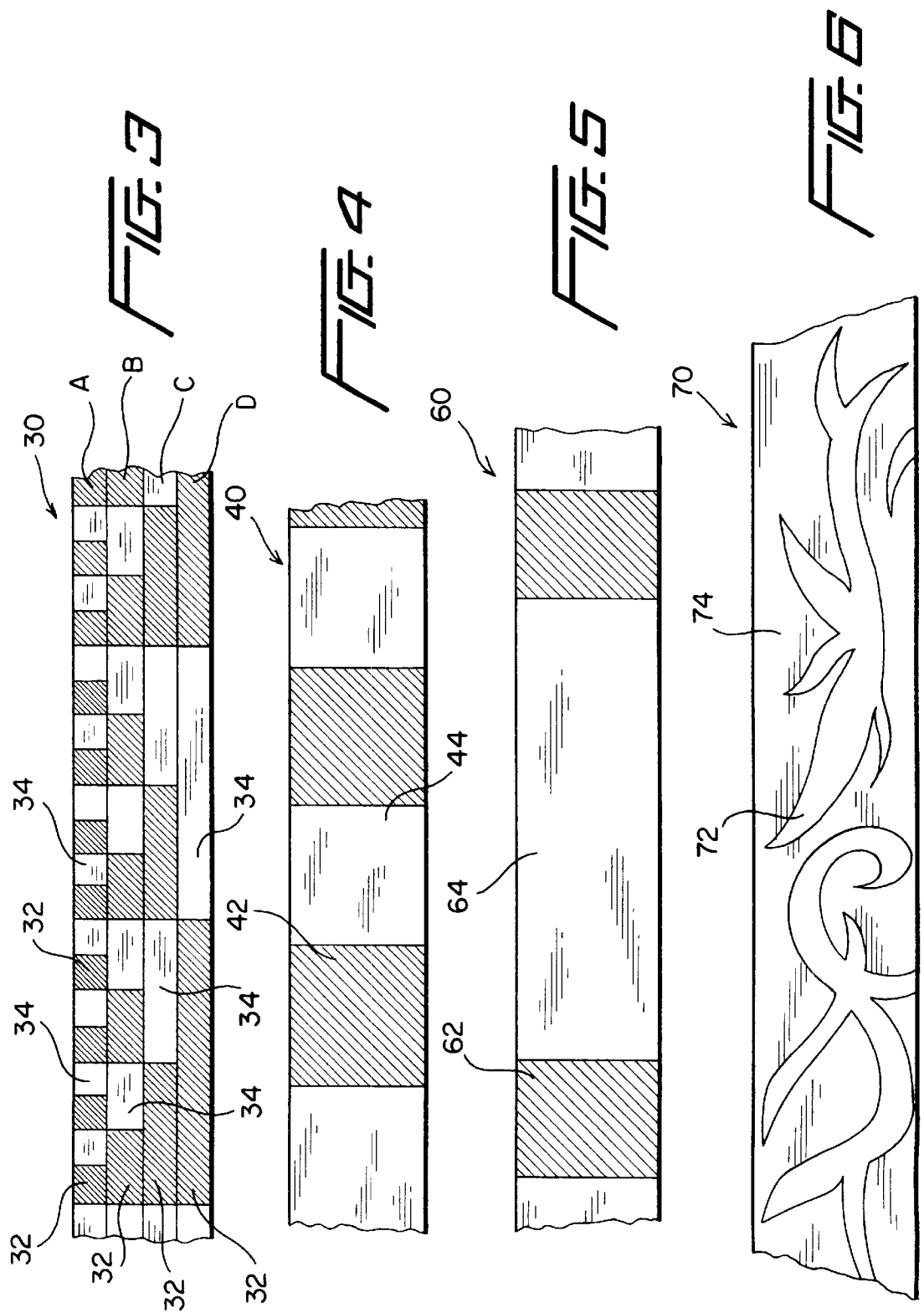

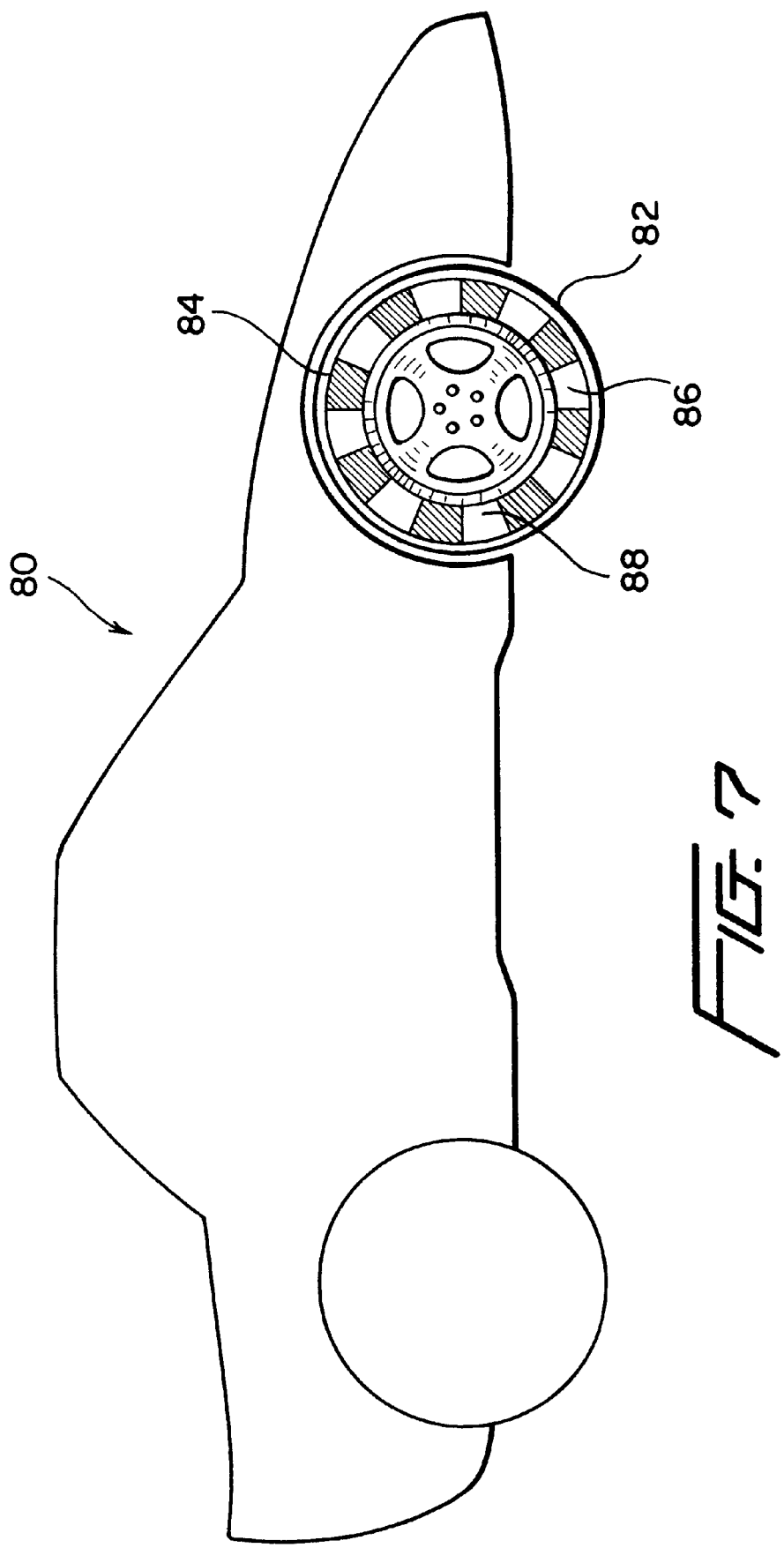

SPEED INDICATION MARKINGS FOR TIRES

BACKGROUND OF INVENTION

1. Field of Invention

This invention is directed to the field of novelty speed indicators. In particular, the invention is directed to a periodic color pattern imprinted on a tire that provides an indication of speed as well as entertainment when the tire is moving.

2. Description of the Related Art

Cyclists presently must rely upon bicycle cyclometers to determine the speed at which the cyclist is traveling. Analog cyclometers have a movable arm on a circular gauge face that points to an approximate indication of the speed at which the cyclist is traveling. Cyclometer gauges are difficult to read by cyclists. Typically, a cyclist is pumping the pedals and the bike and the cyclist, together, are subject to the irregularities in the surface across which the cyclist is traveling. The vibrations of the gauge caused by this movement can make it difficult for the cyclist to ascertain the speed at which the cyclist is traveling with any degree of accuracy. Typically, the resolution at which the cyclist may determine the speed is between 3 to 5 miles per hour. Digital displays, by contrast, may provide a more accurate reading, however, the vibration of the bicycle relative to the cyclist can make it difficult for the cyclist to read the digital display. Additionally, conventional speed indicators are just plain boring.

SUMMARY OF THE INVENTION

The present invention is a periodic pattern of color applied to a tire. The frequency of the color pattern is determined based upon a predetermined rotational speed at which the colors will appear to blend together to form a new predetermined color. For example, a periodic pattern of yellow and blue will blend above a predetermined speed to appear as a consistent green color.

The periodic pattern of colors may be applied to a bicycle tread such that when a cyclist is riding a bicycle having tires incorporating the present invention with the periodic color pattern applied to the tread of the tire, the cyclist will be able to determine when a predetermined speed is attained merely by viewing the tread of the tire.

The periodic pattern may be purely functional as in a series of blocks of colors. However, the periodic pattern may also include decorative patterns which are aesthetically pleasing. The periodic pattern of colors may also be applied to a side wall of a tire such that an observer of the cyclist may also determine when a predetermined speed is obtained by the cyclist.

The present invention also provides a substantial entertainment value. It is fun to watch the pattern change colors when riding the bicycle. Children can be entertained when watching the colorful display of the tire speed indications of the present invention.

These and further objects, features and advantages of the present invention will become apparent from the following description when taken in connection with the accompanying drawings which, for purposes of illustration only, shoe several embodiments in accordance with the present invention.

BRIEF DESCRIPTION OF THE DRAWINGS

FIG. 3 is a plan view of a portion of a tire tread having first embodiment of the speed indicating tread pattern according to present invention with multiple periodic patterns;

FIG. 4 is a view similar to that of FIG. 3 showing a second embodiment of the present invention;

FIG. 5 is a view similar to that of FIG. 3 showing a third embodiment of the present invention;

FIG. 6 is a view similar to that of FIG. 3 showing a fourth embodiment of the present invention; and FIG. 7 is a elevation view of the color pattern of the present invention incorporated on a side wall of a tire of an automobile.

DETAILED DESCRIPTION OF THE INVENTION

Figure 1:
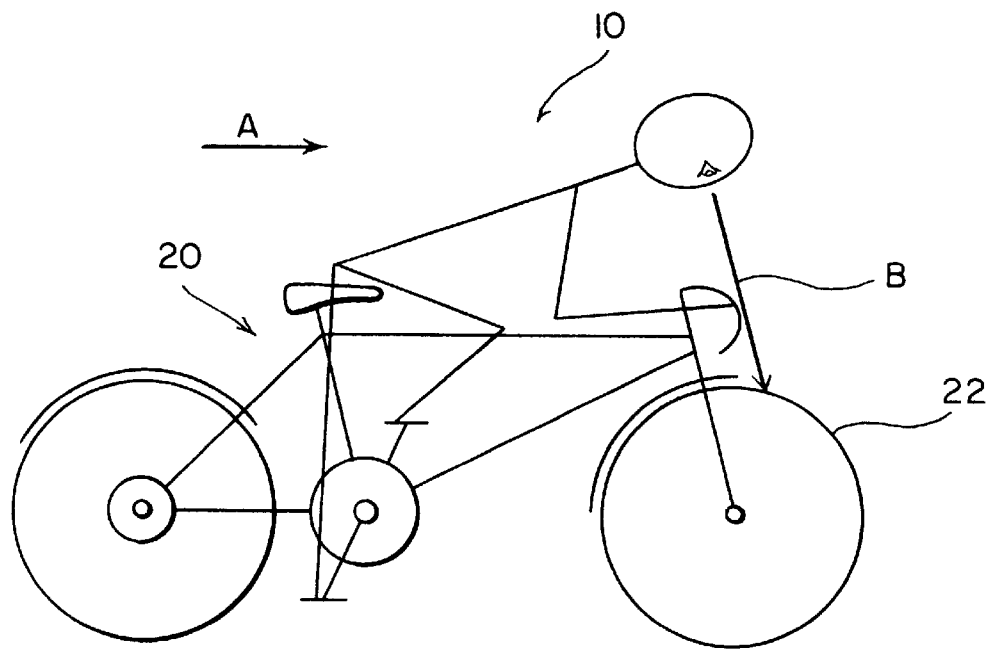
FIG. 1 is a diagrammatic side view of a cyclist riding a bicycle having tires that incorporate an embodiment of the present invention.
Figure 2:
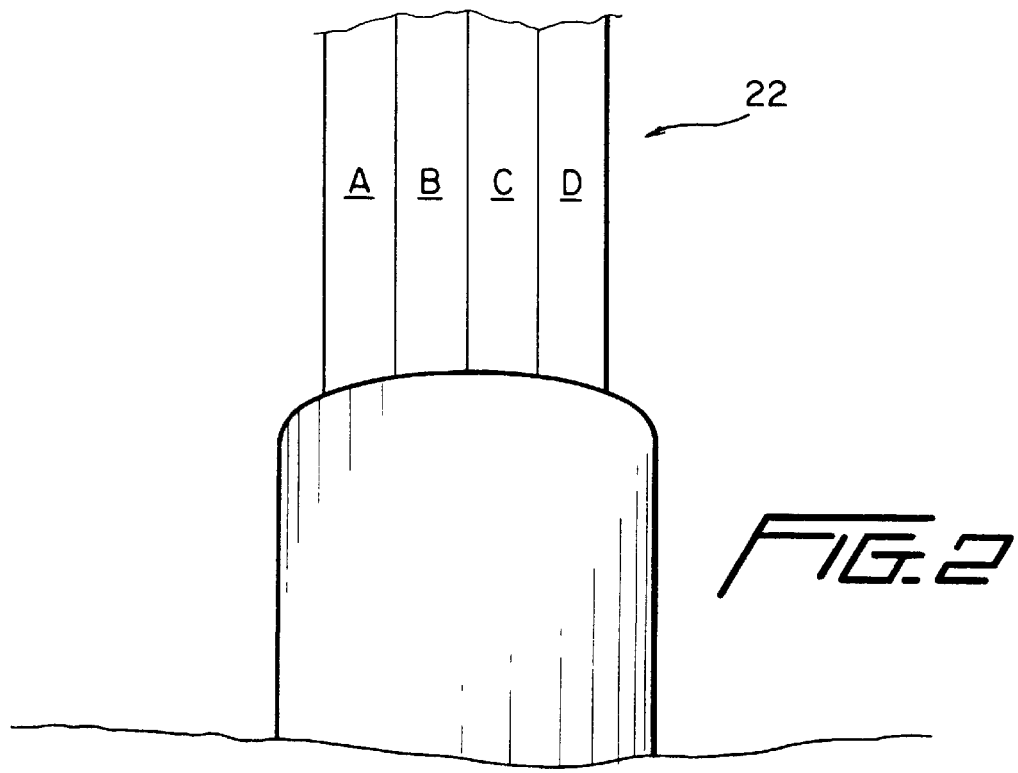
FIG. 2 is a plan view of a portion of the tire tread of the bicycle of FIG. 1 as viewed by the cyclist.

FIG. 1 is an elevational view of a cyclist 10 riding a bicycle 20. The cyclist 10 is observing the tire tread 22 of the bicycle 20 along a line of sight that is indicated by arrow B while the cyclist is traveling in the direction of arrow A. FIG. 2 is a plan view that the cyclist sees along the line of sight B from FIG. 1. The tire tread 22 includes 4 tread regions: A, B, C, and D. Each tread region includes a periodic color scheme which differs from the adjacent regions in order of decreasing frequency from A to D. As the rider rides the bicycle, the rider may observe the top of tread 22 and determine the approximate speed of the bicycle based upon the blending of the colors in each tread region.

FIG. 3 shows a first embodiment of a tire tread pattern 30 in accordance with the present invention. Similar to the tread pattern at FIG. 2, the tire tread pattern 30 includes 4 regions A through D. Each of the tread regions A through D includes colored areas having a first color area 32 and a second color area 34 that are distributed periodically within each region A through D. In the embodiment of FIG. 3, region A includes a periodic color pattern having a frequency that is twice the frequency of the periodic pattern of region B. As the tire tread 30 moves, a rider 10 observing the pattern will initially be able to distinguish the color regions 32 and 34 from each other. However, as the speed of the tread increases, the color patterns 32 and 34 will appear to the observer to blend together above a predetermined speed. For example, the color regions 32 may be colored blue while the color regions 34 may be colored yellow. As the tire tread increases in speed, the colored areas 32 and 34 will appear to blend together above a predetermined speed and will appear to the rider as a continuous green strip. Even though the rider 10 may perceive the color region A as being a single blended color, the other periodic color pattern regions B–D will still appear to the rider to have distinct color areas 32 and 34. However, as the rider accelerates the bicycle, the tread will increase in speed until a second predetermined speed is attained at which the colors areas 32 and 34 in the second periodic pattern region B will also appear to blend. As the rider continues to accelerate, the remaining regions C and D will, similarly, appear to blend as they reach their corresponding predetermined speeds. In this manner, the rider may determine his approximate speed merely by observing the color patterns and their blending characteristics as the cyclists rides.

FIG. 4 illustrates a second embodiment of a tread pattern 40 in accordance with the present invention. The tread pattern 40 includes a periodic pattern of colored areas 42 and 44. The color pattern 40 is simpler than the first embodiment of the invention shown in FIG. 1 because it only includes a single periodic color pattern region. And therefore, a rider may only determine whether his speed is above a single predetermined speed when the color regions 42 and 44 appear to blend together.

FIG. 5 illustrates a third embodiment of a periodic color pattern 60 in accordance with the present invention. The third periodic color pattern includes color region 62 and 64. The color regions 62 are much shorter than the color regions 64. As a result, the color patterns 62 will not appear to blend with the color pattern 64. Rather, the rider will be able to observe the speed of the individual color regions 62. In this manner, the rider may be able to more easily determine when the rider is slowing down or increasing speed.

FIG. 6 is a plan view of a fourth embodiment of a periodic color pattern 70 in accordance with the present invention. The periodic color pattern includes color regions 72 and 74. The periodic color pattern 70 is different from the previous embodiments in that the periodic color 70 pattern includes periodic ornamental colored regions 72. The colored regions 72 may be randomly designed but yet still provide necessary degree of periodicity to enable a rider to determine a predetermined speed.

FIG. 7 is an elevational view of a vehicle 80 incorporating a vehicle tire 82 having sidewalls with a periodic color pattern 84. The periodic color pattern includes colored regions 86 and 88. In this embodiment of the present invention, an observer of the vehicle 80 may determine whether the vehicle exceeds a predetermined speed by observing the rotation of the periodic colored pattern 84. The periodic colored pattern 84 has a frequency which appears to an observer to blend above a predetermined speed. Such an embodiment may be useful for law enforcement officials in enforcing the speed limit on public highways. A law enforcement officer merely needs to observe the periodic color pattern on the sidewall of the tire of the vehicle to determine whether the predetermined speed is being exceeded.

While various embodiments in accordance with the present invention have been shown and described, it is understood that the invention is not limited thereto, and is susceptible to numerous changes and modifications as known to those skilled in the art. For example, the number of color pattern bands need not be limited to four and may be coordinated to each of the appropriate shift point speeds of a multi-gear bicycle which is equipped with the tire (which can be as much as 21 or 28) to facilitate gear-shifting by a novice rider through visual identification of particular color band changes. Therefore, this invention is not limited to the details shown and described herein, and includes all such changes and modifications.

What is claimed is:

1. A vehicle tire comprising at least one predetermined speed indicator located on a wall of said tire and having a periodic color pattern composed of at least a first color region and a second color region, said first and second color regions being of different chromatic colors from each other and from the color of said tire, said chromatic colors being arranged in each region in a pattern having a periodic frequency which is set to cause the colors of the first and second color regions to at least partially visually blend to another color during rotation of the tire, said another color indicating that said predetermined speed has been reached.

2. The vehicle tire of claim 1, wherein said vehicle tire comprises a bicycle tire.

3. The vehicle tire of claim 1, wherein said periodic color pattern is applied to a tread of said vehicle tire.

4. The vehicle tire of claim 1, wherein the pattern of said first color region and the pattern of said second color region are substantially the same size and shape.

5. The vehicle tire of claim 1, wherein the patterns of said first and second color regions are each comprised of a series of elements, the element of the pattern of the first color region being smaller than the elements of the pattern of said second color region.

6. The vehicle tire of claim 1, wherein said vehicle tire comprises an automobile tire.

7. The vehicle tire of claim 1, wherein said periodic color pattern is applied to a side wall of said vehicle tire.

8. A vehicle tire according to claim 1, wherein the first color region surrounds the second color region.

9. A vehicle tire according to claim 8, wherein the second color region comprises separate areas of different configurations.

10. A vehicle tire according to claim 1, wherein at least one of the color regions comprises separate areas of different configurations.

11. A vehicle tire according to claim 10, wherein at least one of the configurations comprises circumferentially extending portions connected to axially extending portions.

12. A vehicle tire according to claim 1, further comprising at least a third color region and a fourth color region, said third and fourth color regions being of a different chromatic color from each other and being arranged in each of said third and fourth color regions in a respective pattern with a periodic frequency which is set so cause the colors of the third and fourth color regions to at least partially visually blend to another color during rotation of the tire at a predetermined speed which is different from the predetermined speed at which the colors of the first and second color regions appear to at least partially visually blend.

* * * * *